United States Patent [19]

Mennemann et al.

[11] 4,439,531
[45] Mar. 27, 1984

[54] CDO-THO$_2$-FREE, HIGHLY REFRACTIVE OPTICAL GLASS

[75] Inventors: Karl Mennemann, Taunusstein; Volkmar Geiler, Mainz-Finthen, both of Fed. Rep. of Germany

[73] Assignee: 501 Schott Glaswerke, Mainz, Fed. Rep. of Germany

[21] Appl. No.: 400,968

[22] Filed: Jul. 22, 1982

[30] Foreign Application Priority Data

Jul. 30, 1981 [DE] Fed. Rep. of Germany ....... 3130039

[51] Int. Cl.$^3$ ............................ C03C 3/08; C03C 3/10
[52] U.S. Cl. ........................................ 501/75; 501/76; 501/78; 501/901
[58] Field of Search ...................... 501/75, 76, 78, 901

[56] References Cited

U.S. PATENT DOCUMENTS

| | | | |
|---|---|---|---|
| 3,563,773 | 2/1971 | Bromer et al. | 501/901 |
| 3,958,999 | 5/1976 | Izumitani et al. | 501/901 |
| 4,120,732 | 10/1978 | Komorita et al. | 501/901 |
| 4,128,432 | 12/1978 | Komorita et al. | 501/901 |
| 4,213,787 | 7/1980 | Faulstich et al. | 501/901 |

FOREIGN PATENT DOCUMENTS

| | | | |
|---|---|---|---|
| 2009390 | 2/1970 | France | 501/901 |
| 52-14607 | 2/1977 | Japan | 501/901 |

Primary Examiner—Mark Bell
Attorney, Agent, or Firm—Haight & Associates

[57] ABSTRACT

CdO- and ThO-free, highly refractive optical glass having a refractive index of 1.85-2.05 and an Abbe index of 25-43, characterized by the following composition (in percent by weight):

| | |
|---|---|
| $SiO_2$ | 5-15 |
| $B_2O_3$ | 2.5-8 |
| $SiO_2 + B_2O_3$ | 7-23 |
| $SiO_2/B_2O_3$ | 1.3-2.1 |
| $La_2O_3$ | 43-56 |
| $Gd_2O_3$ | 0-14 |
| $La_2O_3 + Gd_2O_3$ | 43-60 |
| $ZrO_2$ | 3-10 |
| $Nb_2O_5$ | 0-15 |
| $Ta_2O_5$ | 0-20 |
| $Nb_2O_5 + Ta_2O_5$ | 11-22 |

5 Claims, No Drawings

CDO-THO₂-FREE, HIGHLY REFRACTIVE OPTICAL GLASS

TECHNICAL FIELD OF THE INVENTION

The present invention relates to highly and maximally refractive optical glasses with a high Abbe index and to the manufacture of optical glasses with previously unattained refractive indexes of up to 2.05 and Abbe indexes of >25.

BACKGROUND OF THE INVENTION

Japanese published patent application No. 79/133,506 describes glasses having refractive indeces of 1.90–1.95 and similar Abbe values as described in the present invention; however, refractive values of only up to 1.95 can be achieved and these values only if a considerable amount of $GeO_2$ is employed, which is very expensive.

Glasses having refractive values of up to 1.95 and similar Abbe indexes are also described in Japanese published patent application 79/90,218; however, these familiar glasses contain either expensive $GeO_2$ or are not sufficiently stable towards devitrification.

DISCLOSURE OF THE INVENTION

The present invention relates to highly and maximally refractive optical glasses with a high Abbe index and to the manufacture of optical glasses with refractive indexes of up to 2.05 and Abbe indexes of greater than 25.

One very important characteristic of the present invention is the surprisingly high ratio of $SiO_2/B_2O_3$, which lies between 1.3 and 2.1 in accordance with the invention. Most previously known glasses in this elevated position in the nd-, vd-diagram have required formulas in which the $B_2O_3$ component was greater than the $SiO_2$ component. For example, the maximum $SiO_2/B_2O_3$ ratio in glasses according to DOS 26/53,581 is equal to 1. In glasses according to DAS No. 1,926,959 with nd=1.9 and vd=40, the $SiO_2/B_2O_3$ ratio is approximately 0.75; moreover, these glasses contain expensive $GeO_2$. The same holds true for glasses according to DOS 20/57,706.

Some other highly refractive optical glasses having an $SiO_2/B_2O_3$-ratio of $\geq 1$ are described in DAS 1,061,976. All examples named therein with refractive indexes of >1.85 have $La_2O_3$ components of about 63 percent by weight. Such high concentrations of $La_2O_3$ components destabilize the glasses; additionally, these glasses must contain $Al_2O_3$ or $Y_2O_3$.

The optimum $SiO_2/B_2O_3$ ratio according to the invention lies between 1.6–1.9. To achieve the required high refractive indexes of $\geq 1.86$, 43–56 percent by weight of $La_2O_3$ are required and, optionally, 0–14 percent by weight of $Gd_2O_3$, with the sum of these two components amounting to 43–60 percent by weight.

The amount of $ZrO_2$ is between 3–10 percent by weight. It is mandatory to have 11–22 percent by weight of the pentavalent substitute glass producers $Ta_2O_5$ and $Nb_2O_5$, whereby the component of $Nb_2O_5$ may be between 0–15 percent by weight and that of $Ta_2O_5$ between 0–20 percent by weight. Only with these high amounts of $Nb_2O_5$ and/or $Ta_2O_5$ can glasses of the required optical position be molten which are sufficiently stable to devitrification; additionally, these components increase the refractive index considerably. Additionally, PbO, (0–13 percent by weight), $TiO_2$ (0–13 percent by weight), $WO_3$ (0–23 percent by weight) and ZnO (0–3 percent by weight) can be added.

BEST MODE FOR CARRYING OUT THE INVENTION

Glasses in accordance with the present invention are produced in the following manner: The starting materials (the appropriate oxides, nitrates, and carbonates) are weighed in accordance with the formula; a small portion of refining agent, such as $As_2O_3$, is added in small amounts and everything is mixed well. This mixture is melted in a Pt-crucible at 1450–1550 degrees C., is clarified and homogenized well by means of an agitator. The mixture is then stirred until the casting temperature of about 1400 degrees C. is reached, and is then cast in an iron form.

The table contains 11 compositions and their optical values by way of example:

TABLE

| EXAMPLE | 1 | 2 | 3 | 4 | 5 | 6 | 7 | 8 | 9 | 10 | 11 |
|---|---|---|---|---|---|---|---|---|---|---|---|
| $SiO_2$ | 10.80 | 5.40 | 7.10 | 10.90 | 7.35 | 10.35 | 7.75 | 7.45 | 12.70 | 14.55 | 7.40 |
| $B_2O_3$ | 6.35 | 3.00 | 4.40 | 6.55 | 4.35 | 5.80 | 5.85 | 4.25 | 6.90 | 7.10 | 4.20 |
| $La_2O_3$ | 54.85 | 49.45 | 47.90 | 47.75 | 43.80 | 50.10 | 55.30 | 54.25 | 45.65 | 46.30 | 53.50 |
| $ZrO_2$ | 8.50 | 5.75 | 5.35 | 5.80 | 6.20 | 9.60 | 8.40 | 3.65 | 7.60 | 7.05 | 7.50 |
| $Nb_2O_5$ | 4.35 | 8.55 | 8.35 | 7.10 | 5.40 | 6.50 | 9.70 | 9.60 | | 11.60 | 9.47 |
| $Ta_2O_5$ | 13.50 | 9.45 | 12.55 | 8.35 | 7.65 | 10.50 | 11.00 | 10.90 | 16.35 | | 10.75 |
| PbO | 1.00 | 11.95 | 1.75 | 2.45 | 2.25 | 4.70 | 1.30 | 3.60 | | 0.75 | 3.55 |
| $TiO_2$ | 0.65 | 6.45 | 12.60 | 0.80 | 0.75 | | 0.70 | 6.30 | | 0.40 | 3.65 |
| | | | | $WO_3$ 10.30 | $WO_3$ 22.25 | Zno 2.45 | | | $Gd_2O_3$ 10.80 | $Gd_2O_3$ 12.25 | |
| nd | 1.9111 | 2.0488 | 2.0373 | 1.9189 | 1.9712 | 1.9255 | 1.9594 | 2.0430 | 1.8630 | 1.8780 | 1.9940 |
| vd | 38.50 | 27.10 | 26.75 | 34.50 | 30.75 | 35.60 | 35.00 | 30.10 | 42.10 | 38.20 | 31.40 |
| $SiO_2/B_2O_3$ | 1.70 | 1.8 | 1.61 | 1.66 | 1.69 | 1.78 | 1.32 | 1.75 | 1.84 | 2.05 | 1.76 |

What is claimed is:

1. CdO- and ThO-free, highly refractive optical glass which are stable to devitrification and have a refractive index nd of 1.85–2.05 and an Abbe index vd of 25–43, consisting essentially of the following composition (in percent by weight):

| | |
|---|---|
| $SiO_2$ | 5–15 |
| $B_2O_3$ | 2.5–8 |
| $SiO_2 + B_2O_3$ | 7–23 |
| $SiO_2/B_2O_3$ | 1.6–1.9 |
| $La_2O_3$ | 43–56 |
| $Gd_2O_3$ | 0–14 |
| $La_2O_3 + Gd_2O_3$ | 43–60 |
| $ZrO_2$ | 5–9 |
| $Nb_2O_5$ | 0–15 |
| $Ta_2O_5$ | 0–20 |
| $Nb_2O_5 + Ta_2O_5$ | 11–22 |

2. Glass as claimed in claim 1, further containing 0.4–13 percent by weight of TiO$_2$.

3. Glass as claimed in claim 1, further containing 0.75–13 percent by weight of PbO.

4. Glass as claimed in claim 1, further comprising 10–23 percent by weight of WO$_3$.

5. Glass as claimed in claim 1, further containing 1–3 percent by weight of ZnO.

* * * * *